United States Patent [19]

Tran et al.

[11] Patent Number: 6,061,775
[45] Date of Patent: *May 9, 2000

[54] APPARATUS AND METHOD FOR PREDICTING A FIRST MICROCODE INSTRUCTION OF A CACHE LINE AND USING PREDECODE INSTRUCTION DATA TO IDENTIFY INSTRUCTION BOUNDARIES AND TYPES

[75] Inventors: Thang M. Tran; Mauricio Calle, both of Austin; Shane Southard, Cedar Park, all of Tex.

[73] Assignee: Advanced Micro Devices, Inc., Sunnyvale, Calif.

[*] Notice: This patent is subject to a terminal disclaimer.

[21] Appl. No.: 08/989,793

[22] Filed: Dec. 12, 1997

[51] Int. Cl.⁷ .................................................. G06F 13/00
[52] U.S. Cl. .......................... 712/1; 712/206; 712/208; 712/209; 710/1
[58] Field of Search ............................. 395/800.01, 386, 395/380, 587; 712/1, 206, 208, 209; 711/213; 710/1

[56] References Cited

U.S. PATENT DOCUMENTS

| | | | |
|---|---|---|---|
| 4,241,397 | 12/1980 | Strecker et al. | 711/220 |
| 4,853,849 | 8/1989 | Bain, Jr. et al. | 711/202 |
| 5,408,674 | 4/1995 | Norrie et al. | 395/384 |
| 5,438,668 | 8/1995 | Coon et al. | |
| 5,537,338 | 7/1996 | Coelho | 395/200.34 |
| 5,537,629 | 7/1996 | Brown et al. | |
| 5,581,718 | 12/1996 | Grochowski | 395/382 |
| 5,625,787 | 4/1997 | Mahin et al. | 395/380 |
| 5,630,082 | 5/1997 | Yao et al. | |
| 5,630,083 | 5/1997 | Carbine et al. | |
| 5,689,672 | 11/1997 | Witt et al. | |
| 5,740,392 | 4/1998 | Brennan | 395/386 |
| 5,751,981 | 5/1998 | Witt et al. | |
| 5,758,116 | 5/1998 | Lee et al. | 395/386 |
| 5,761,521 | 6/1998 | Chilinski et al. | 395/800.01 |
| 5,809,272 | 9/1998 | Thusoo et al. | 395/386 |
| 5,815,700 | 9/1998 | Poplingher et al. | 395/587 |
| 5,822,555 | 10/1998 | Brown et al. | 395/380 |
| 5,881,260 | 3/1999 | Raje et al. | 711/213 |
| 5,890,006 | 3/1999 | Tran et al. | 712/1 |

FOREIGN PATENT DOCUMENTS

0651322A1   5/1995   European Pat. Off. .

*Primary Examiner*—Meng-Ai T. An
*Assistant Examiner*—John Ciccozzi
*Attorney, Agent, or Firm*—Conley, Rose & Tayon, PC; B. Noel Kivlin

[57] ABSTRACT

A superscalar microprocessor predecodes instruction data to identify the boundaries of instructions and the type of instruction. To expedite the dispatch of instructions, when a cache line is scanned, the first scanned instruction is predicted to be a microcode instruction and is dispatched to the MROM unit. A microcode scan circuit uses the microcode pointer and the functional bits of the predecode data to multiplex instruction specific bytes of the first microcode instruction to the MROM unit. If the predicted first microcode instruction is not the actual first microcode instruction, then in a subsequent clock cycle, the actual microcode instruction is dispatched the MROM unit and the incorrectly predicted microcode instruction is canceled.

18 Claims, 11 Drawing Sheets

APPARATUS AND METHOD FOR PREDICTING A FIRST MICROCODE INSTRUCTION OF A CACHE LINE AND USING PREDECODE INSTRUCTION DATA TO IDENTIFY INSTRUCTION BOUNDARIES AND TYPES

BACKGROUND OF THE INVENTION

1. Field of the Invention

This invention relates to the field of microprocessors and, more particularly, to the detection and dispatch of microcode instructions within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

Unfortunately, having variable byte length instructions creates numerous problems for dispatching multiple instructions per clock cycle. Because the instructions have differing numbers of bytes, an instruction may begin at any memory address. Conversely, fixed length instructions typically begin at a known location. For example, a 4 byte fixed length instruction set has instructions which begin at 4 byte boundaries within memory (i.e. the two least significant bits are zeros for the memory addresses at which instructions begin).

In order to locate multiple variable byte length instructions during a clock cycle, instruction bytes fetched by the microprocessor may be serially scanned to determine instruction boundaries and thereby locate instructions which may be concurrently dispatched. Serial scanning involves a large amount of logic, and typically a large number of cascaded logic levels. For high frequency (i.e. short clock cycle time) microprocessors, large numbers of cascaded logic levels may be deleterious to the performance of the microprocessor. Some microprocessor designs employ predecoding to identify the beginning and end of instructions as the instructions are stored into an instruction cache within the microprocessor. Even with predecoding, locating and dispatching multiple instructions per clock cycle is a complex and often clock-cycle-limiting operation. Multiple levels of multiplexing are employed, and significant bussing between the multiplexors and the instruction bytes being dispatched is needed to allow arbitrary selection of bytes from the instruction bytes being examined for dispatch. The first instruction to be dispatched may be located anywhere within the instruction bytes. The second instruction to be dispatched is then located at the end of the first instruction, etc.

Additionally, some microprocessor designs employ two types of instructions. A first type, called fast-path instructions, may be directly decoded. Another type called microcode or microcode instructions, are parsed into a plurality of simple instructions prior to execution. The microprocessor in addition to locating and dispatching instructions within a clock cycle must also determine whether an instruction is a fast-path or microcode instruction and convey the instruction to the appropriate portions of the microprocessor for decoding an execution. Still further, the opcode of a microcode instruction must be detected prior to decoding. The process of locating an instruction, identifying the type of instruction, dispatching the instruction and locating the opcode of the dispatched instruction is a complex operation that can create a bottleneck in processor throughput.

SUMMARY OF THE INVENTION

The problems outlined above are in large part solved by the prediction of the first microcode instruction of a cache line in accordance with the present invention. A predecode unit detects a first microcode instruction within a cache line. A microcode pointer identifying the location of the first instruction is stored as a part of the predecode information. Other predecode information may include a start pointer, an end pointer and functional bits identifying prefix bytes, opcode bytes, etc. When the cache line is accessed, the instruction addressed by the microcode pointer is speculatively conveyed to the microcode unit. This instruction is referred to herein as the speculative first microcode instruction. The microcode unit uses the predecode data, such as the functional bits, to identify the opcode and begins decoding the speculative first microcode instruction. In parallel with the MROM unit decoding the speculative first microcode instruction, an instruction scan unit determines whether the speculative first microcode instruction is actually the first microcode instruction. The speculative first microcode instruction may be incorrect for several reasons. For example, if a branch instruction branched to an instruction other than the first instruction in the cache line, the actual first microcode instruction may be subsequent to the speculative first microcode instruction. If the speculative first microcode instruction was mispredicted, the instruction is invalidated and the correct microcode instruction is conveyed to the MROM unit in the next clock cycle. Accordingly, the processor may take a one clock cycle penalty for an incorrect prediction of the first microcode instruction.

Broadly speaking, the present invention contemplates a microprocessor including a predecode unit, an instruction cache, a microcode unit, and an instruction scan. The predecode unit is configured to generate predecode data that identifies a location of a speculative instruction within a cache line. The instruction cache is coupled to the predecode unit and it includes an instruction storage for storing instructions and a predecode storage for storing predecode data. The microcode unit is configured to parse a microcode instruction into one or more fastpath instructions and dispatch the fastpath instructions into an instruction processing pipeline. The instruction scan unit is coupled between the instruction cache and the microcode unit and is configured to convey the speculative instruction identified by the predecode data to the microcode unit and to verify that the speculative instruction is a first microcode instruction within the cache line. If the speculative instruction is not a first microcode instruction, the instruction scan unit conveys a signal to the microcode unit to invalidate the speculative instruction.

The present invention further contemplates method of predicting a first microcode instruction of a cache line including: predecoding a first cache line to detect a location of a speculative first instruction within the first cache line; storing the detected location of the speculative first instruction as a microcode pointer; dispatching an instruction addressed by the microcode pointer to a microcode unit when the first cache line is encountered; verifying that the instruction addressed by the microcode pointer is a first microcode instruction to be executed in the cache line; and invalidating the instruction if the instruction addressed by the microcode pointer is not the first microcode instruction to be executed in the cache line.

BRIEF DESCRIPTION OF THE DRAWINGS

Other objects and advantages of the invention will become apparent upon reading the following detailed description and upon reference to the accompanying drawings in which.

Figure 1:
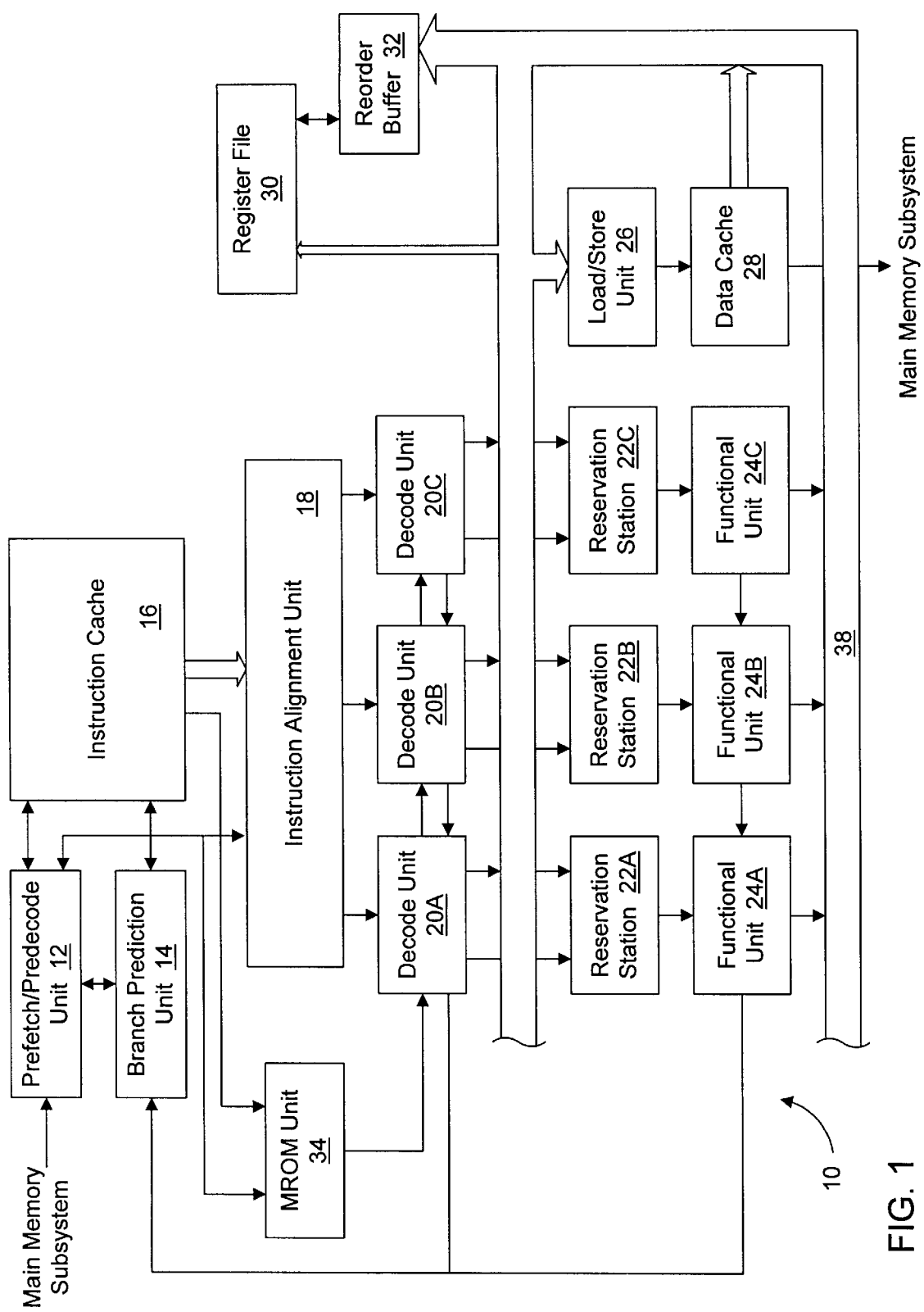
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Detailed Description of the Invention

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 instruction alignment unit 18, and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. In one embodiment, as prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. In one embodiment, prefetch/predecode unit 12 additionally detects the location of the first microcode instruction within the cache line and stores a microcode pointer identifying the location of the first microcode instruction.

In one embodiment, instructions within instruction cache 16, which are not predecoded when fetched from memory, or the predecode data is invalid, are predecoded by prefetch/predecode unit 12 when fetched from instruction cache 16. There may be several reasons for instructions not being predecoded when fetched from memory. For example, if a branch instruction, that is predicted taken, branches around a section of code, the branched around instructions are not predecoded. The non-predecoded instructions may later be fetched for execution either due to a branch misprediction or another branch to the non-predecode instructions. Alternatively, data may be invalid if a branch instruction jumps to a byte other than the start byte of an instruction. For example, a branch instruction may jump to the opcode byte of an instruction and by-pass any prefix bytes. This invalidates the predecode data and may require the predecode data to be regenerated when the instruction is fetched from instruction cache 16. The new or regenerated predecode data may be stored in the instruction cache.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as microcode, or MROM, instructions, according to one embodiment. The terms "microcode instruction" and "MROM instruction" may be used interchangeable throughout the specification. For fast path instructions, the functional bit is asserted for each prefix byte included in the instruction, and cleared for other bytes. Alternatively, for microcode instructions, the functional bit is unasserted for each prefix byte and set for other bytes. The type of instruction may be determined by examining the functional bit corresponding to the end byte. If that functional bit is unasserted, the instruction is a fastpath instruction. Conversely, if that functional bit is asserted, the instruction is a microcode instruction. The opcode of a fastpath instruction may thereby be located as the byte associated with the first unasserted functional bit in the instruction. Conversely, the opcode of a microcode instruction is the byte associated with the first asserted bit in the instruction. For example, a microcode instruction including two prefix bytes, a Mod R/M byte, and an immediate byte would have start, end, and functional bits as follows:

| | |
|---|---|
| Start bits | 10000 |
| End bits | 00001 |
| Functional bits | 00111 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

Microcode instructions are instructions which are determined to be too complex for decode by decode scan units 20. Microcode instructions are executed by invoking MROM unit 34. More specifically, when a microcode instruction is encountered, MROM unit 34 parses and issues the instruction into a subset of defined fast path instructions to effectuate the desired operation. MROM unit 34 dispatches the subset of fast path instructions to decode units 20. According to one embodiment of microprocessor 10, floating point instructions are classified as MROM (i.e. microcode) instructions for instruction fetching and dispatch purposes in instruction cache 16.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B, and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
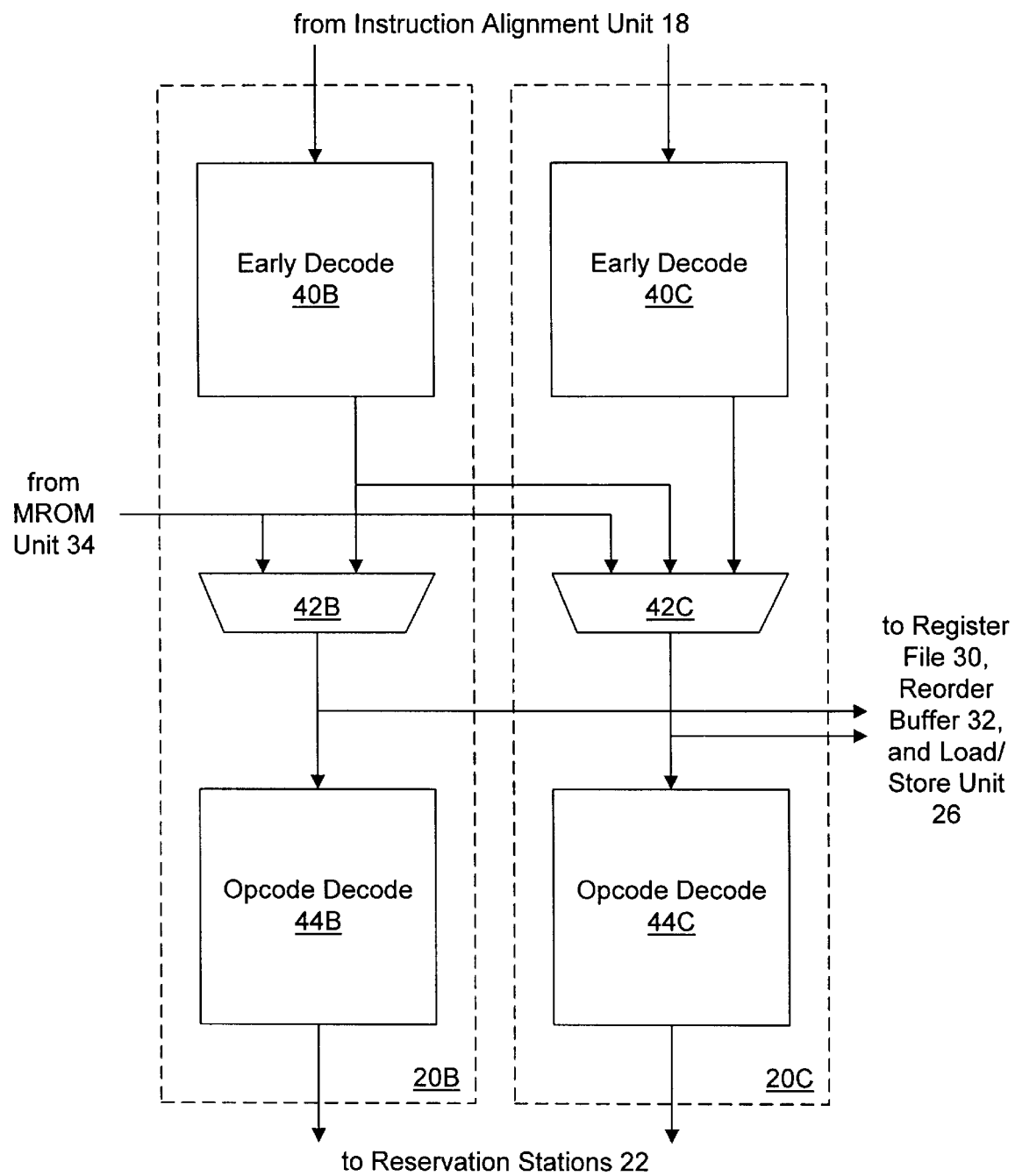
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular microcode instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of microcode instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit. Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

During times in which the early double unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

Figure 3:
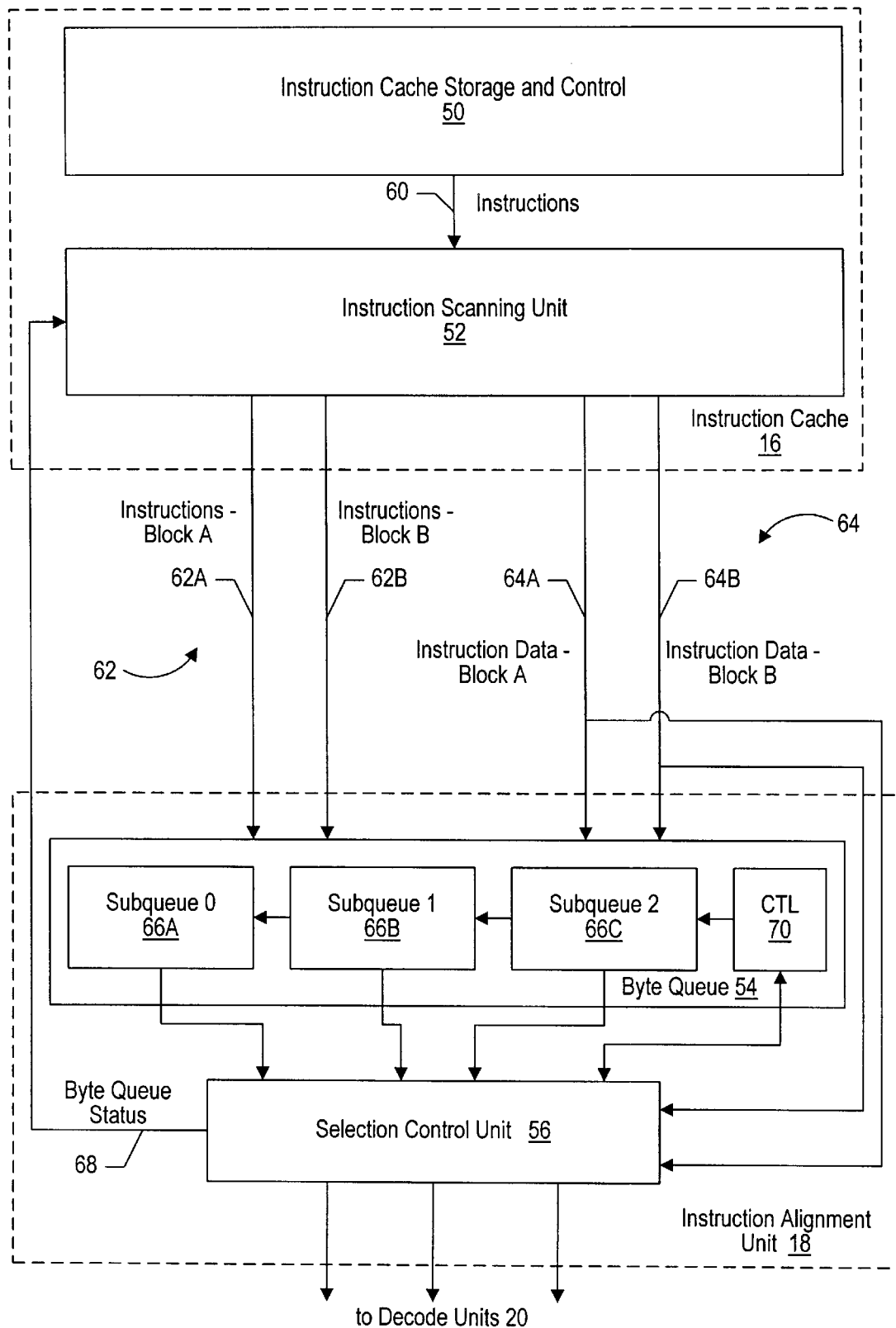
FIG. 3 is a block diagram of an instruction cache and instruction alignment unit according to one embodiment of the present invention.

Turning now to FIG. 3, a block diagram of one embodiment of instruction cache 16 and instruction alignment unit 18 are shown. Instruction cache 16 includes an instruction cache storage and control block 50 and an instruction scanning unit 52. Instruction alignment unit 18 includes a byte queue 54 and a selection control unit 56.

Instruction cache storage and control block 50 includes storage for instruction cache lines and related control circuitry for fetching instructions from the storage, for selecting cache lines to discard when a cache miss is detected, etc. Instruction cache storage and control block 50 receives fetch addresses from branch prediction unit 14 (shown in FIG. 1) in order to fetch instructions for execution by microprocessor 10. Instruction bytes fetched from instruction cache storage and control block 50 are conveyed to instruction scanning unit 52 upon an instructions bus 60. Instruction bytes are conveyed upon instructions bus 60, as well as corresponding predecode data (e.g. start, end, and functional bits). In one embodiment, sixteen bytes stored in contiguous memory locations are conveyed upon instructions bus 60 along with the corresponding predecode data. The sixteen bytes form either the upper or lower half of the 32 byte cache line employed by instruction cache 16 according to the present embodiment. The upper half of the cache line is the half stored in memory addresses having larger numerical values, while the lower half is stored in memory addresses having smaller numerical values. Additionally, instruction scanning unit 52 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 52 scans the predecode data associated with the bytes which are to be conveyed as instructions to instruction alignment unit 18. Instruction scanning unit 52 divides the sixteen bytes conveyed by instruction cache storage and control block 50 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 50, according to the present embodiment. As used herein, bytes are contiguous if they are stored in contiguous memory locations in the main memory subsystem. It is noted that particular sizes of various components are used herein for clarity of the description. Any size may be used for each component within the spirit and scope of the appended claims.

Instruction scanning unit 52 scans the predecode data of each portion of the instruction bytes independently and in parallel. These portions scanned by scanning unit 52 comprise the fixed number of bytes defined to be an instruction block. Instruction scanning unit 52 therefore scans the predecode data to identify up to the maximum number of instructions per block.

The instruction bytes and instruction identification information generated by instruction scanning unit 52 are conveyed to byte queue 54 upon an instructions bus 62 and an instruction data bus 64, respectively. As shown in FIG. 3, instructions bus 62 includes an instructions—block A bus 62A and an instructions—block B bus 62B. Instructions—block A bus 62A conveys the instruction bytes corresponding to the first instruction block being scanned by instruction scanning unit 52 (in program order). Similarly, instructions—block B bus 62B conveys the instruction bytes corresponding to the second instruction block being scanned by instruction scanning unit 52.

Instruction identification information corresponding to the instruction bytes conveyed upon instructions—block A bus 62A is conveyed upon instruction data—block A bus 64A. Similarly, instruction identification information corresponding to the instruction bytes conveyed upon instructions—block B bus 62B is conveyed upon instruction data—block B bus 64B. Instruction data—block A bus 64A and instruction data—block B bus 64B comprise instruction data bus 64 as shown in FIG. 3. Each eight byte portion and the corresponding instruction identification information forms an instruction block.

Byte queue 54 receives the instruction blocks conveyed and stores them into one of multiple subqueues included therein. In the embodiment shown, byte queue 54 includes three subqueues: a first subqueue 66A, a second subqueue 66B, and a third subqueue 66C. First subqueue 66A stores the instruction block which is foremost among the instruction blocks stored in byte queue 54 in program order. Second subqueue 66B stores the instruction block which is second in program order, and third subqueue stores the instruction block which is third in program order.

If a particular eight byte portion as scanned by instruction scanning unit 52 includes more than the maximum number of instructions per block, then the particular eight byte portion is retained by instruction scanning unit 52. During the following clock cycle, the particular eight byte portion is scanned again. The predecode data corresponding to the previously identified instructions included within the previously dispatched instruction block is invalidated such that instruction scanning unit 52 detects the additional instructions. If the other eight byte portion concurrently received with the particular eight byte portion is subsequent to the particular eight byte portion in program order, then the other eight byte portion is rescanned as well. Byte queue 54 discards the instruction block received from the other eight byte portion, in order to retain program order among the instruction blocks stored in the byte queue.

Selection control unit 56 conveys a byte queue status upon byte queue status bus 68 to instruction scanning unit 52. Byte queue status bus 68 includes a signal corresponding to each subqueue 66. The signal is asserted if the subqueue 66 is storing an instruction block, and deasserted if the subqueue 66 is not storing an instruction block.

Figure 4:
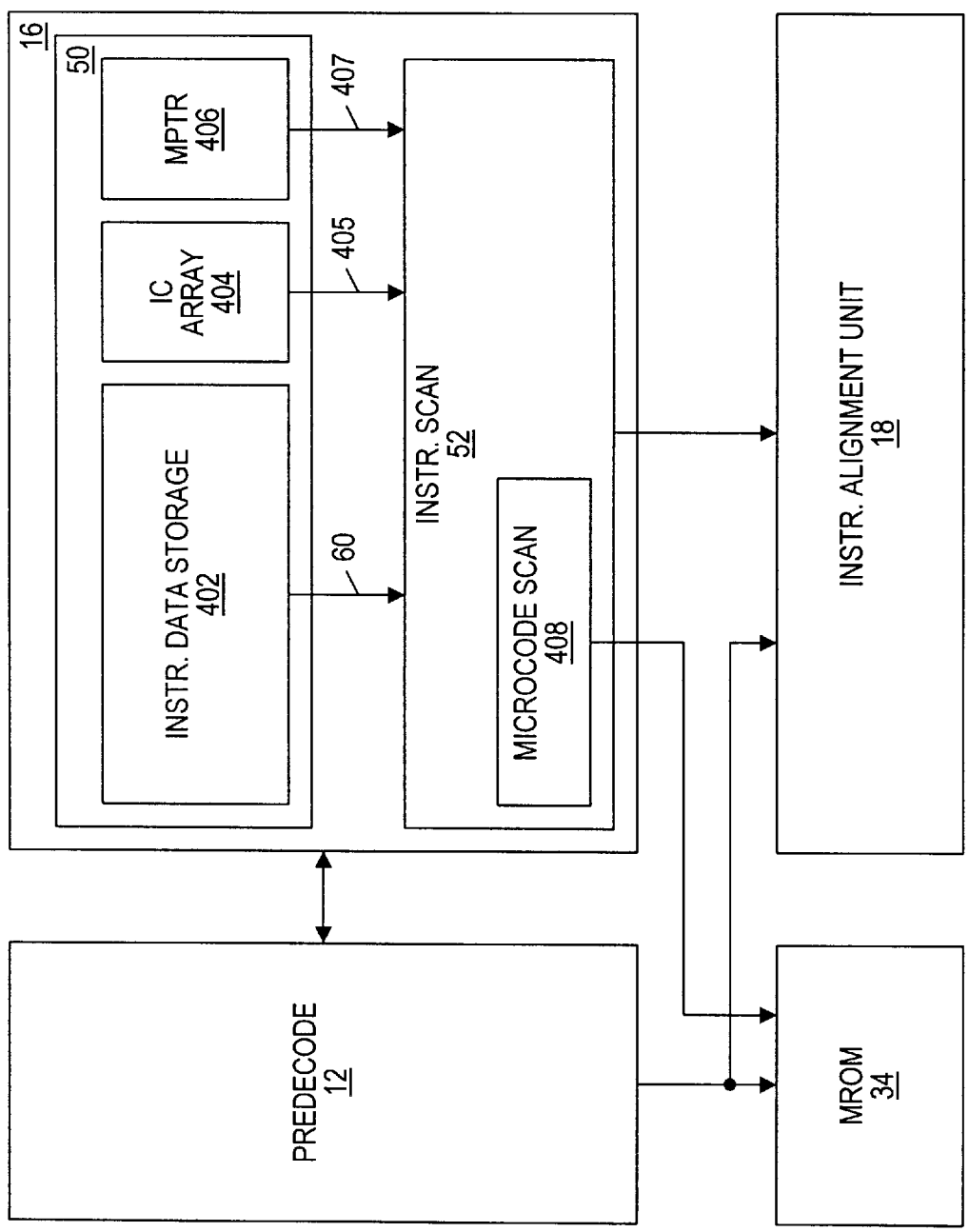
FIG. 4 is a block diagram of a predecode unit, an instruction cache, an MROM unit, and an instruction alignment unit according to one embodiment of the present invention.

Turning now to FIG. 4, a block diagram of a predecode unit, an instruction cache, an MROM unit and an instruction alignment unit is shown. Interconnection between the blocks is highlighted in FIG. 4 according to one embodiment of microprocessor 10. Additional interconnection may be provided as necessary according to design choice. As mentioned above, predecode unit 12, in one embodiment, predecodes instructions to identify the start byte, the end byte and the type of instruction. Predecode unit 12 may predecode instructions are they are fetched from main memory or may predecode instructions stored in instruction cache 16. In one embodiment, the predecode data includes three bits for each instruction byte. The instruction bytes and predecode data are stored in instruction cache storage and control 50. In one embodiment, predecode unit 12 additionally generates a microcode pointer (MPTR) which identifies the instruction byte that stores the start byte of the first microcode instruction. The microcode instruction identified by the MPTR is referred to as the "speculative first microcode instruction." Instruction cache storage and control 50 includes an instruction data storage 402, an I.C. array 404, and an MPTR array 406. Instruction data storage 402 stores the instruction bytes of the cache lines. I.C. array 404 stores the predecode data other than the MPTR. In one embodiment, I.C. array 404 stores a start bit, end bit and functional bit for each instruction byte. MPTR array 406 stores one or more MPTRs for each cache line. In one embodiment, two MPTR's are stored per cache line, one for each half of the cache line. The MPTR includes a sufficient number of bits to identify a byte within the cache line or portion of the cache line. For example, if each cache line includes 16 bytes, the MPTR may include four bits.

Instruction scan 52 routes the instruction bytes from instruction data 402 to MROM 34 or instruction alignment unit 18 based upon the predecode data stored in I.C. array 404 and the MPTR stored in MPTR array 16. The predecode information allows multiple instructions to be scanned and quickly dispatched to MROM unit 34 and instruction alignment unit 18.

If predecode information for a cache line, or a portion of a cache line, has not been generated when the cache line is fetched from instruction cache storage 50, the cache line is conveyed to predecode unit 12, which generates the predecode data for the cache line. In the same clock cycle, predecode unit 12 may detect the first instruction within the cache line and convey the instruction to instruction alignment unit 18 or MROM unit 34. The predecode data generated by predecode unit 12 is stored in I.C. array 404. Additionally, predecode unit 12 generates an MPTR which is stored in MPTR array 406. As discussed above, the MPTR speculatively identifies the location of the first microcode instruction within the cache line.

When a cache line that has been previously predecoded is executed, instruction cache 52 scans the plurality of instruction bytes using the predecode data stored in I.C. array 404. Instruction scan unit 52 additionally uses the MPTR stored in MPTR array 406 to detect the speculative first microcode instruction within the cache line and conveys the speculative first microcode instruction to MROM unit 34. Instruction scan 52 includes a microcode scan unit 408 which uses the MPTR to identify the speculative first microcode instruction and routes the microcode instruction to MROM unit 34. In one embodiment, microcode scan unit 408 additionally identifies the instruction specific bytes, including the opcode byte, of the first microcode instruction using the functional bits of the predecode data. In the illustrated embodiment, instruction scan unit 52 may additionally convey a plurality of instructions to instruction alignment unit 18 in the same clock cycle. In one particular embodiment, instruction scan unit 52 identifies and conveys six fastpath instructions per clock cycle to instruction alignment unit 18.

The speculative first microcode instruction is the first microcode instruction within the cache line. The first microcode instruction within the cache line, however, may not be the first microcode instruction dispatched for execution. For the purposes of this disclosure, the first microcode instruction that is dispatched for execution is referred to as the "actual first microcode instruction." For example, a branch instruction may branch to an instruction subsequent to the first microcode instruction in the cache line. Accordingly, the actual first microcode instruction will be the first microcode instruction subsequent to the target address of the branch instruction. Accordingly, the speculative first microcode instruction is not always the actual first microcode instruction.

In a clock cycle subsequent to the clock cycle in which the speculative first microcode instruction is dispatched to MROM unit 34, instruction scan unit 52 determines the actual first microcode instruction. If the actual first microcode instruction is the same as the speculative first microcode instruction, execution continues. If, however, the actual first microcode instruction is not the same as the speculative first microcode instruction, then instruction scan unit 52 outputs a control signal to MROM unit 34 indicating that the speculative first microcode instruction is invalid. Instruction scan unit 52 may additionally convey the actual first microcode instruction to MROM unit 18. Accordingly, a one clock cycle penalty is incurred for incorrect predictions of the first microcode instruction.

In one embodiment, the MPTR is updated to identify the actual microcode instruction was a misprediction is discovered. In this manner, if the same starting point within the cache line is encountered, the speculative microcode instruction will be correct. If, however, a different starting point is encountered, the MPTR may be incorrect. In another embodiment, the MPTR is not updated on a misprediction, the MPTR derived during predecode is maintained. This embodiment eliminates the circuitry necessary to update the MPTR and prevents the flip-flop of the MPTR when two starting points in the cache line are alternately addressed.

In an alternative embodiment, the first scanned instruction of a cache line is predicted to be a microcode instruction. In this embodiment, there is no need to detect and store the location of the first microcode instruction in a cache line. Instruction scan unit 52 predicts that the first instruction encountered in a cache line is a microcode instruction and conveys the instruction MROM unit 34. If the first scanned instruction is a microcode instruction, then the prediction is correct. If the first scanned instruction is a fast path instruction, the actual microcode instruction is dispatched the MROM unit in the subsequent clock cycle. This one cycle delay could be avoided if the microcode instruction was properly predicted. However, in one embodiment, a microcode instruction cannot be dispatched to the functional units in the same clock cycle as the fast path instruction (i.e. no packing of MROM and fastpath instructions). Accordingly, the one cycle delay is transparent because the microcode instruction would have been delayed a cycle prior to dispatch even if it was conveyed to the MROM unit at the same time as the fast path instruction. In other words, the latency of the misprediction is hidden in a later stage of the pipeline because fast path instructions are not capable of being packed with microcode instructions. This embodiment advantageously eliminates the latency due to failing to predict that the first scanned instruction is a microcode instruction.

Figure 5:
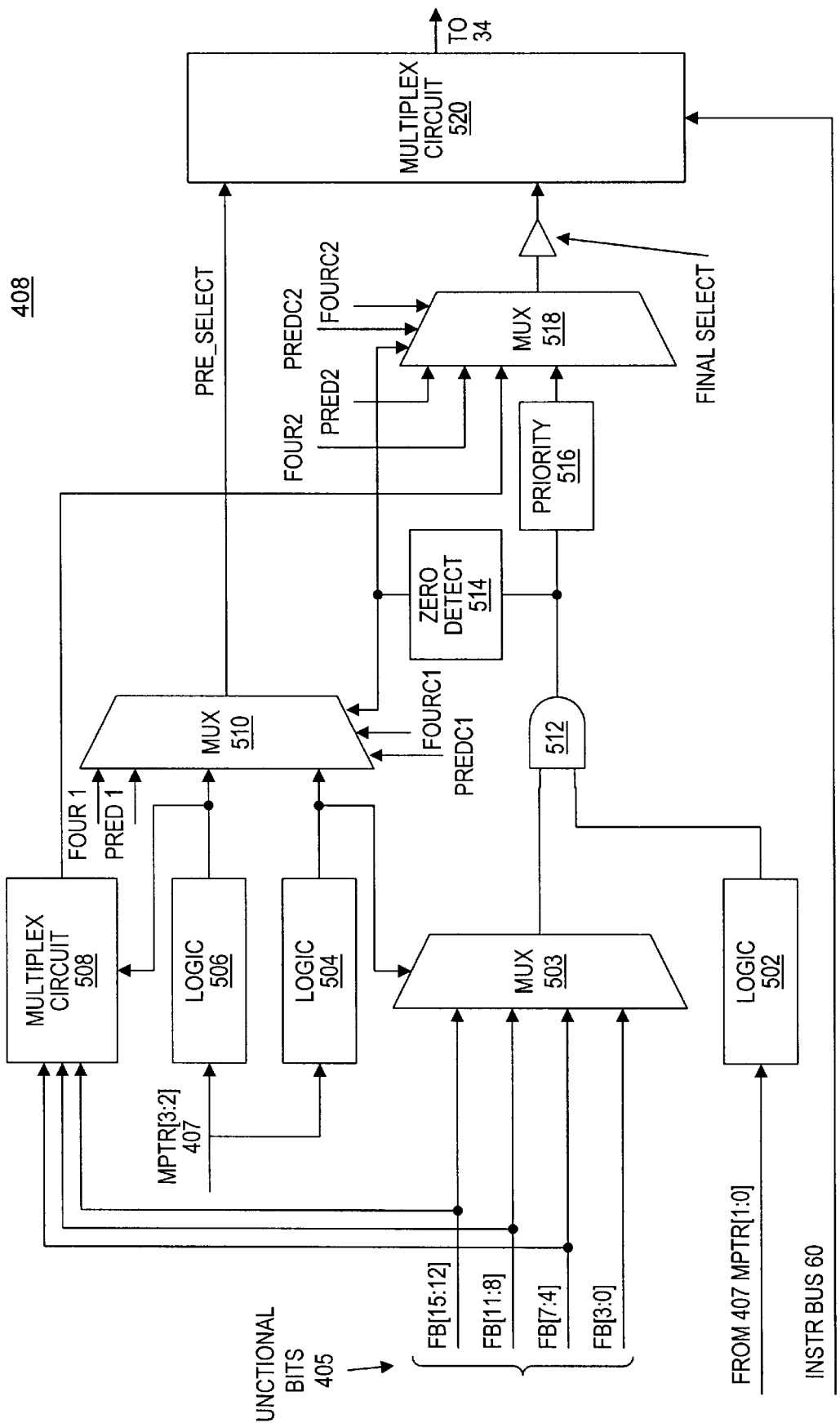
FIG. 5 is a block diagram of a microcode scan unit according to one embodiment of the present invention.

Turning now to FIG. 5, a block diagram of microcode scan unit 408 is shown according to one embodiment of the present invention. In the illustrated embodiment, microcode scan unit 408 receives the instruction bytes on instruction bus 60, the functional bits on bus 405 and the MPTR on bus 407. Microcode scan unit 408 outputs the instruction specific bytes of the microcode instruction identified by MPTR. For x86 instructions, the instruction specific bytes are the opcode(s), MODR/M and SIB bytes. Microcode scan circuit 408 includes logic circuit 502, logic circuit 504, logic circuit 506, multiplex circuit 508, multiplexor 510, AND gate 512, zero detector 514, logic circuit 516, multiplexor 518, buffer 519 and multiplex circuit 520.

In the illustrated embodiment, microcode scan unit 408scans sixteen instruction bytes. The functional bits on bus 405 include 16 bits and MPTR includes four bits. One functional bit is associated with each byte of the cache line. The first asserted functional bit associated with a byte subsequent to the byte identified by MPTR identifies the opcode byte, which is the first instruction specific byte of the speculative first microcode instruction.

In the illustrated embodiment, the functional bits are broken into four groups of four bits each labeled: FB[3:0], FB[7:4], FB[11:8] and FB[15:12]. Each set of four bits is coupled to multiplexor 503. The three most significant sets of functional bits are coupled to multiplex circuit 508. The two most significant bits of the MPTR are coupled to logic circuits 504 and 506. The output of logic circuit 506 is coupled to multiplex circuit 508 and an input of multiplexor 510. The output of logic circuit 504 is coupled to a control input of multiplexor 503 and an input of multiplexor 510. The least significant bits of the MPTR are coupled to logic circuit 502. An output of logic circuit 502 is coupled to one input of AND gate 512. An output of multiplexor 503 is coupled to another input of AND gate 512. An output of AND gate 512 is coupled to zero detector 514 and logic circuit 516. An output of zero detector 514 is coupled to a control input of multiplexor 510 and a control input of multiplexor 518. An output of logic circuit 516 and an output of multiplex circuit 508 are coupled to inputs of multiplexor 518. An output of multiplexor 510 provides a pre-select control signal to multiplexor 520, and an output of multiplexor 518 provides a final select control signal to multiplexor 520. Instruction bus 60 is coupled to an input of multiplexor 520. Multiplexor 520 outputs the instruction specific bytes of the speculative first microcode instruction to MROM unit 34.

Generally speaking, microcode scan unit 408 divides the functional bits into four four-bits groups. The two most significant bits of MPTR identify in which of the four-bits groups the speculative first microcode instruction starts (the opcode byte may not be the same byte as the start byte). The two least significant bits of the MPTR identify which bit position within that group to begin looking for the opcode. As discussed above, the first asserted functional bit subsequent the start of the first microcode instruction is the opcode byte. If there are four prefix bytes, or less, two cases may arise (the special case of greater-than-four prefix bytes is discussed below). First, the functional bit may be in the same group of bits identified by the most significant bits of the MPTR. In this case, the first asserted functional bit is in a bit position greater than the bit position identified by the least significant bits of the MPRT within the group of functional bits identified by the most significant bits of the MPTR. Second, the functional bit may be in the subsequent group of functional bits identified by the most significant bits of the MPTR. In this case, the functional bits in bit positions greater than the positions identified by the least significant bits of the MPTR are unasserted. The first asserted functional bit is in the group of functional bits subsequent to the group of functional bits identified by the most significant bits of the MPTR.

Microcode scan unit 408 determines whether the functional bit is in the group of functional bits identified by the most significant bit of the MPTR by masking the bits below the bit position identified by the least significant bits of the MPTR and using a zero detector to determine if the masked group of functional bits contains an asserted functional bit. Microcode scan unit 408 uses multiplexor 503 to select a group of functional bits identified by the most significant bits of the MPTR. Logic circuit 502 generates a mask to mask the bits below the bit position identified by the least significant bits of the MPTR. Gate 512 logically ANDs the mask with the group of functional bits identified by the most significant bits of the MPTR and outputs the mask value to zero detector 514. If zero detector 514 detects the occurrence of an asserted bit, then the desired functional bit is in the group of bits identified by the most significant of the MPTR (the first case). Alternatively, if zero detector 514 does not detect an asserted bit, and there are four prefix bytes or less, then the desired functional bit is in the group of bits subsequent to the group of bits identified by the most significant bits of the MPTR.

In the first case, the two most significant bits of the MPTR are converted to a one-hot encoding which is provided as a pre-select signal to multiplex circuit 520. The mask output of AND gate 512 is prioritized to identify the first asserted bit of the masked value and the prioritize mask value provides the final select signal for multiplex 520. Alternatively, in the second case, a one-hot encoding of the value one greater-than to value of the most significant bits of the MPTR is provided as the pre-select signal to mulitplex circuit 520. The group of functional bits subsequent to the group identified by the most significant bits of the MPTR are prioritized and provides the final select signal for multiplexor 520.

If more than four prefix bytes are detected, instruction scan unit 52 takes a one cycle penalty to detect the location of the first instruction specific byte. During the next cycle, the location of the first instruction specific byte is determined and the location is provided to multiplexers 510 and 518 via the FOUR1 and FOUR2 signals. The FOURC1 and FOURC2 control signals cause multiplexers 510 and 518 to output the location on the pre-select and final select signal to multiplex circuit 520. In a similar manner, if predecode information is not stored in instruction cache (i.e., the instruction bytes were not predecoded when fetched from main memory), the location of the first instruction specific byte is provided to multiplexers 510 and 518 via the PRED1 and PRED2 signals. The PREDC1 and PREDC2 control signals cause multiplexers 510 and 518 to output the location on the pre-select and final select signal to multiplex circuit 520.

Logic circuit 502 receives the two least significant bits of the MPTR and converts the two bits to a four bit mask used to mask bits below the bit position identified by the least significant bits of MPTR. The most significant bits of MPTR are provided to logic circuits 504 and 506. Logic circuit 504 converts the encoded most significant bits of the MPTR to a four bit one-hot value. Logic circuit 506 converts the two most significant bits of the MPTR to a one-hot value representing the encoded value plus one. The one-hot value output by logic circuit 504 controls the selection of one of the group of the functional bits by multiplexor 503.

The three most significant groups of functional bits are provided to multiplex circuit 508. Mutliplex circuit 508 prioritizes each group of functional bits and outputs one of the prioritized groups based upon the output of logic circuit 506. Each group of functional bits is prioritized such that a bit representing the bit position of the most significant asserted bit is asserted in the prioritized output.

The output of multiplexor 508 is provided as one input of multiplexor 518. The output of multiplexor 503 is masked with the output of logic circuit 502 by AND gate 512. The output of multiplexor 503 is the group of functional bits identified by the two most significant bits of the MPTR. The masked value output from AND gate 512 identifies whether any bits above or including the bit position identified by the two least significant bits of MPTR are asserted. Zero detector 514 detects whether any bits of the masked value are asserted. If no bits are asserted, zero detector 514 causes multiplexor 510 to select the output of logic circuit 506, which identifies the group of bits subsequent to the group of bits identified by the most significant bits of the MPTR as the pre-select signal. Alternatively, if any bits are asserted, then zero detector 514 causes multiplexor 510 to select the output of logic 504, which identifies the group of bits identified by the most significant bits of MPTR as the pre-select signal. The pre-select signal is used by mulitplexer 520 to control a first group of multiplexors. As discussed in more detail below, the outputs of the first group of multiplexors are provided to a second multiplexor which is controlled by the final select signal output by mulitplexer 518.

The output of AND gate 512 is provided to priority logic circuit 516. Similar to the priority logic circuits discussed above in reference to mulitplex circuit 508, priority logic circuit 516 identifies a most-significant asserted bit from the masked output of AND gate 512. This prioritized value is provided to multiplexor 518. The output of zero selector 514 controls mulitplexor 518. If zero detector 514 detects asserted bits in the masked output of AND gate 512, multiplexor 518 selects the output of priority logic circuit 516 as the final select signal. Alternatively, if zero detector 514 does not detect any asserted bits in the masked output of AND gate 512, multiplexor 518 selects the output of multiplex circuit 508 as the final select signal.

The pre-select and final select signal control multiplexor 520 which outputs the instruction-specific bytes of the microcode instruction identified by the MPTR.

Figure 6:
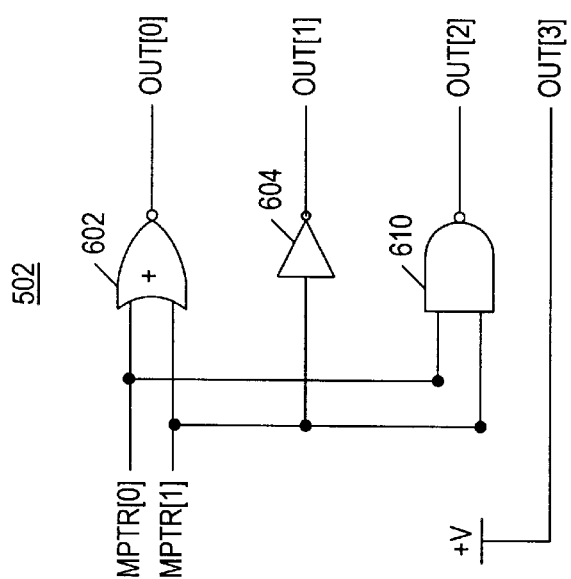
FIG. 6 is a logic diagram of circuit 502 according to one embodiment of the present invention.

Turning now to FIG. 6, a logic diagram of logic circuit 502 according to one embodiment of the present invention is shown. Logic circuit 502 converts the two least significant bits of the MPTR to a mask value. As discussed above, the mask value is used to mask the functional bits of the group of functional bits below a bit position identified by the two least significant bits of the MPTR. If the least of significant bits of the MPTR are 00, the mask value is 1111. If the least significant bits of the MPTR are 01, the mask value is 1110. If the least significant bits of the MPTR are 10, then the mask value is 1100. If the least significant bits of the MPTR are 11, then the mask value 1000. In the illustrated embodiment, a "1" represents bit positions which are not altered by the mask and "0" represents bit positions which are altered by the mask. It is apparent, that in other embodiments the opposite polarity may be used for mask values.

Logic circuit 502 includes NOR gate 602, inverter 604 and NAND gate 610. The least significant bit of the output mask (OUT[0]) is the NOR of the input bits. The second least significant bit is the inverse of the most significant input bit (MPTR[1]. The third least significant bit of the mask is the logical NAND of the two inputs. And the most significant bit of the output mask (OUT[3]) is a logical high.

Figure 7:
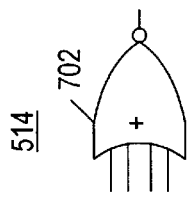
FIG. 7 is a logic diagram of circuit 514 according to one embodiment of the present invention.

Turning now to FIG. 7, logic diagram of zero detector 514 according to one embodiment of the present invention is shown. Zero detector 514 includes a four input NOR gate 702. The output of the NOR gate 702 is unasserted if any of the four inputs are asserted. Alternatively, if all the inputs to NOR gate 702 are unasserted, the output is asserted.

Figure 8:
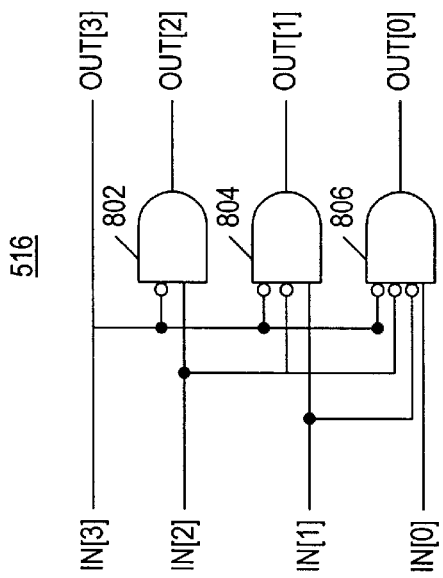
FIG. 8 is a logic diagram of circuit 516 according to one embodiment of the present invention.

Turning now to FIG. 8, a logic diagram of priority circuit 516 according to one embodiment of the present invention is shown. Priority circuit 516 outputs a value with an asserted bit in the bit position of the most-significant asserted bit of the input. The output of priority circuit 516 typically contains one asserted bit. If the input bits includes multiple asserted bits, the output will include an asserted bit in the most-significant asserted bit position and unasserted bits in the other bit positions. Priority circuit 516 includes AND gates 802, 804 and 806. The most significant output bit of priority circuit 516 (OUT[3]) is coupled to the most significant input bit of priority circuit 516 (IN[3]). The second most significant output bit of priority circuit 516 is the logical AND of the inverse of the most significant input bit and the second most significant input bit. The third most significant output bit is the logical AND of the inverse of the most significant input bit, the inverse of the second most significant input bit and the third most significant input bit. The least significant output bit (OUT[0]) is the logical AND of the inverse of the most significant input bit, the inverse of the most second most significant input bit, the inverse of the third most significant input bit and the least significant input bit.

Figure 9:
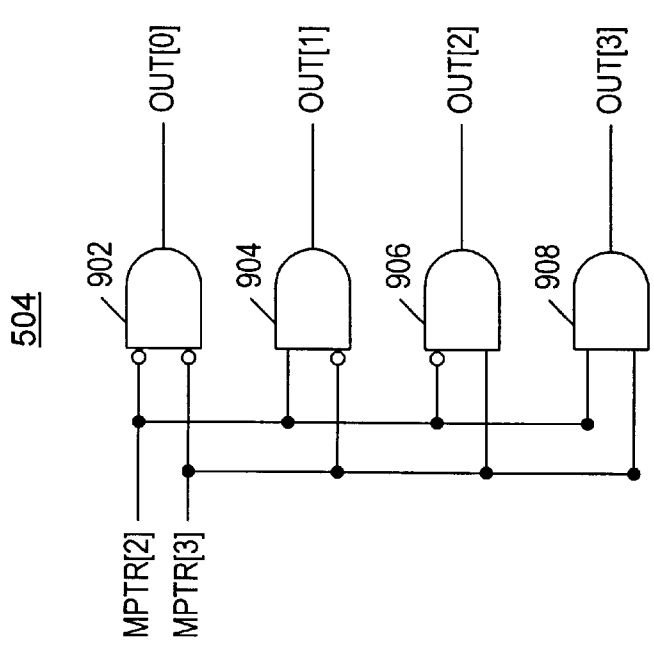
FIG. 9 is a logic diagram of circuit 504 according to one embodiment of the present invention.

Turning now to FIG. 9, a logical diagram of logic circuit 504 according to one embodiment of the present invention is shown. As discussed above, logic circuit 504 converts the encoded two bit value of the most significant bits of the MPTR to a four bit one-hot output. The four bit one-hot output includes one asserted bit identifying the encoded value of the input bits. For example, if the encoded value of the input bits is two (10), then bit two, or the second most significant output bit, is asserted (0100).

Logic circuit 504 includes AND gates 902, 904, 906 and 908. The least significant output bit (OUT[0]) is the logical AND of the inverse of the least significant input bit and the inverse of the most significant input bit. The second least significant output bit is the logical and of the least significant input bit and the inverse of the most significant input bit. The third least significant output bit is the logical AND of the inverse of the least significant bit and the most significant input bit. The most significant output bit (OUT[3]) is the logical AND of the two input bits.

Figure 10:
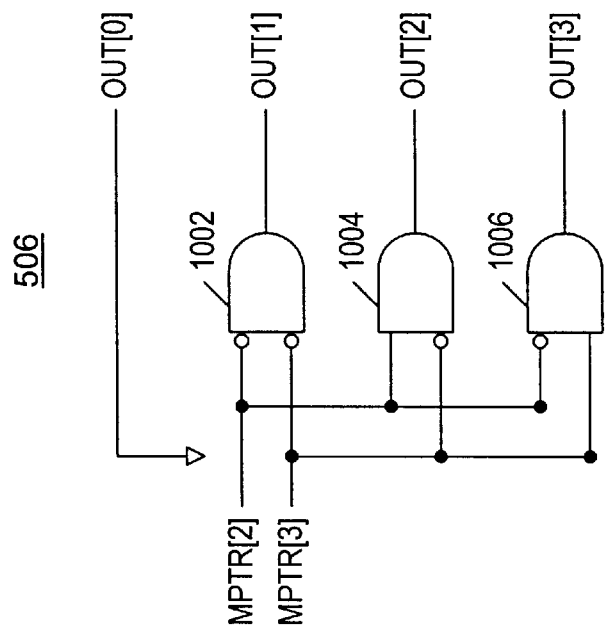
FIG. 10 is a logic diagram of circuit 506 according to one embodiment of the present invention.

Turning now to FIG. 10, logical diagram of logic circuit 506 according to one embodiment of the present invention is shown. As discussed above, logic circuit 506 coverts the encoded value of the most significant bits of the MPTR plus one to a one-hot value. For example, if the encoded value of most significant bits of the MPTR is two (10), the most significant bit of the one-hot output is asserted (1000). In one embodiment, if the encoded value of the most significant input bits is three (1), no bits of the output of logic circuit 506 are asserted.

Logic circuit 506 includes AND gates 1002, 1004 and 1006. The least significant output bit (OUT[0]) is a logical zero. The second least significant output bit is the logical AND of the inverse of the least significant input bit and the inverse of the most significant input bit. The second least significant output bit is the logical AND of the least significant input bit and the inverse of the most significant input bit. The most significant output bit (OUT[3]) is the logical AND of the inverse of the least significant input bit and the most significant input bit.

Figure 11:
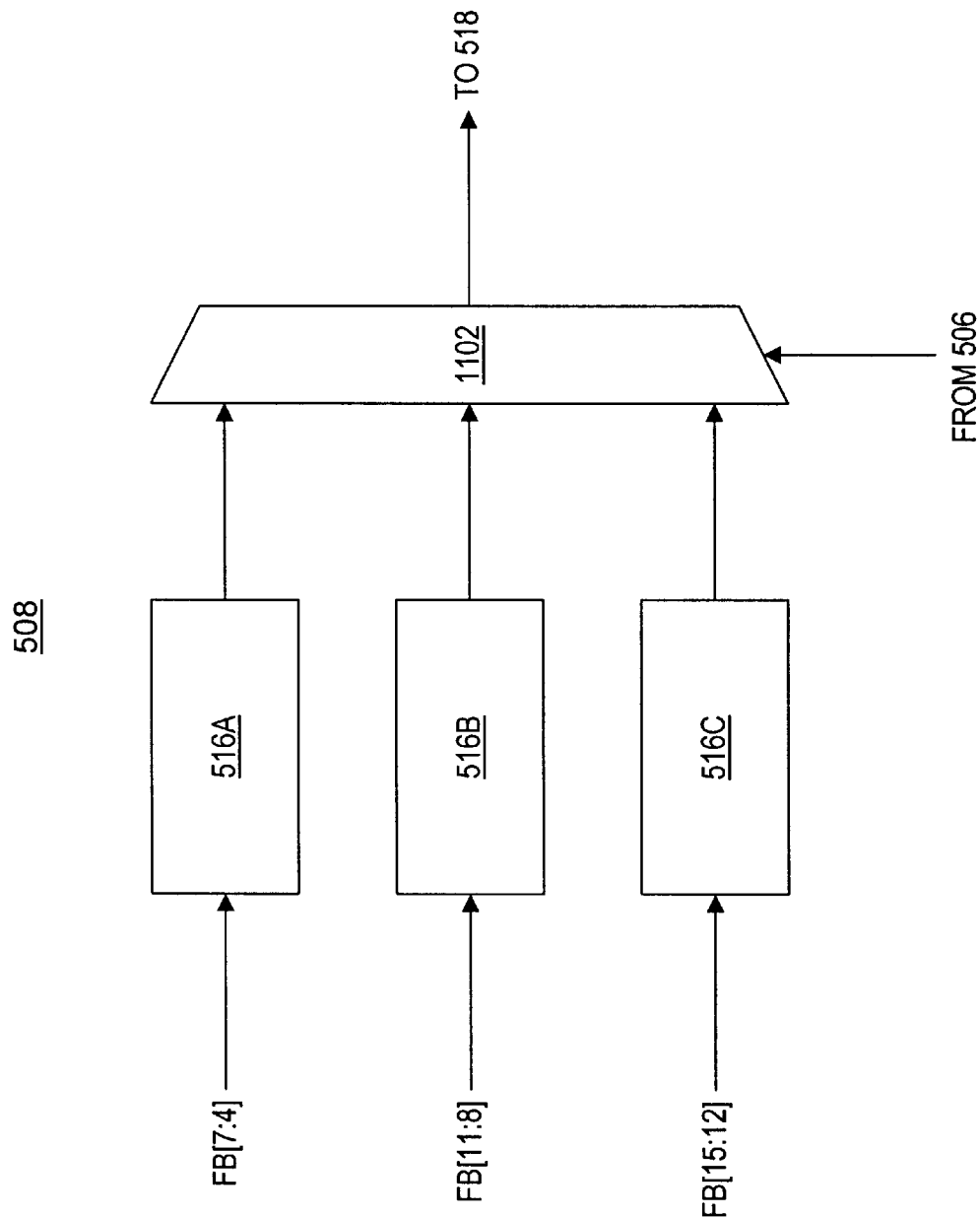
FIG. 11 is a block diagram of multiplex circuit 508 according to one embodiment of the present invention.

Turning now to FIG. 11, a block diagram of multiplex circuit 508 according to one embodiment of the present invention is shown. Multiplex circuit 508 includes multiplexor 1102 and priority circuits 516A, 516B and 516C. Priority circuits 516A–516C are substantially similar to priority circuit 516 described above in reference to FIG. 8. Each priority circuit 516 prioritizes a group of input bits and provides the prioritized output bits to multiplexor 1102. Multiplexor 1102 receives a control signal which selects one of the prioritized group of bits. In an alternative embodiment, multiplex circuit 508 may include multiplexor 1102 with one priority circuit at the output. This circuit is functionally equivalent to the illustrated embodiment and requires less circuitry. The illustrated embodiment, however, allows the prioritization to occur prior to receiving the control signal.

Figure 12:
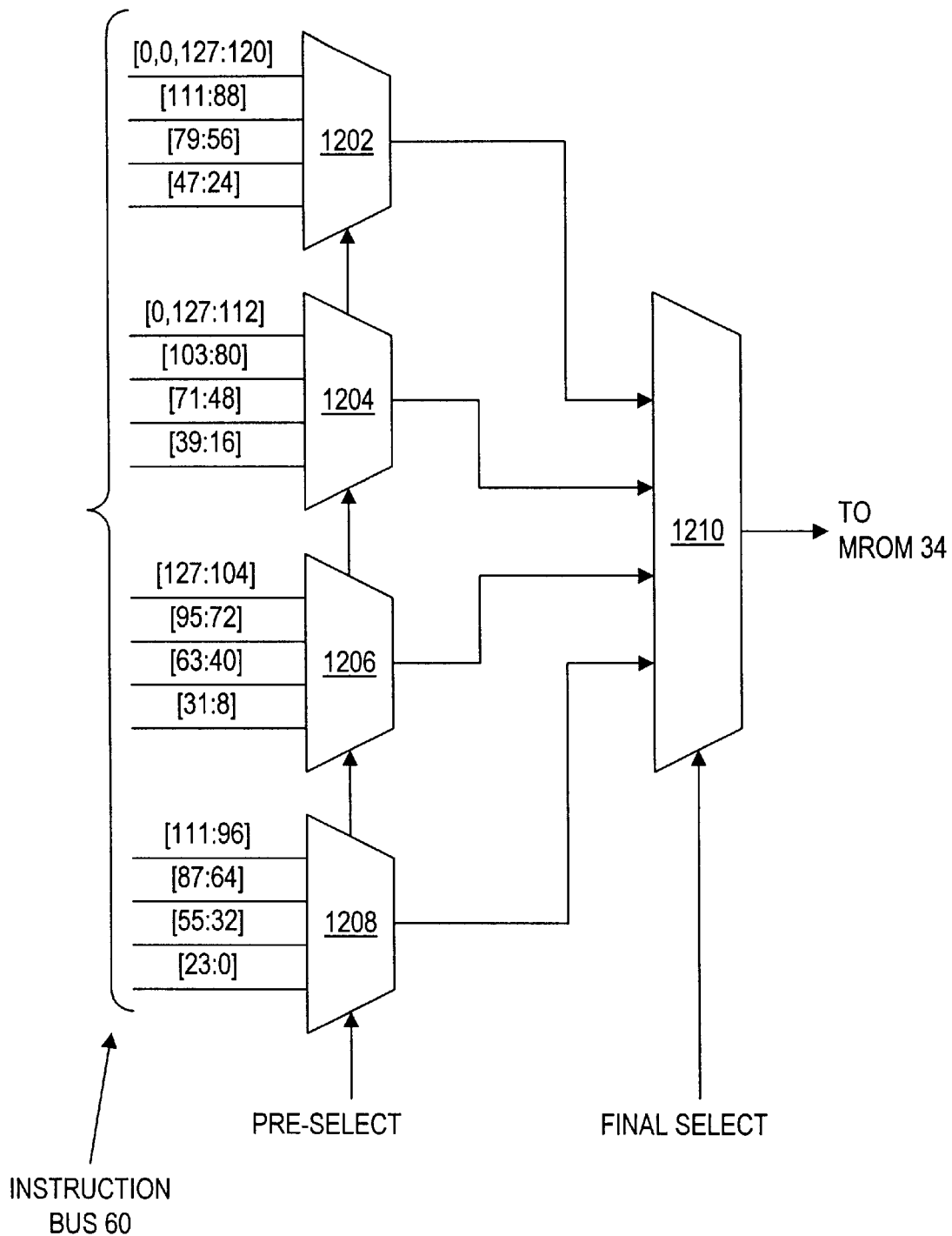
FIG. 12 is a logic diagram of multiplexor 520 according to one embodiment of the present invention.

Turning now to FIG. 12, a logic diagram of multiplexor 520 according to one embodiment of the present invention is shown. Multiplexor 520 includes first-stage multiplexors 1202, 1204, 1206 and 1208 and second stage multiplexor 1210. The first-stage multiplexors are controlled by the pre-select input. Each multiplexor is coupled to four groups of input signals. In the illustrated embodiment, each group of input signals includes a plurality of data lines from instruction bus 60. When the pre-select control signal is available, each of the first-stage multiplexors outputs one group of input signals which are provided to multiplexor 2010. The final select signal then determines which of the outputs of the first-stage multiplexors is provided as the output to MROM unit 34.

In one embodiment, multiplexors 1202–1210 are one-hot multiplexors and the pre-select signal and the final select signal are one-hot signals. For example, if the pre-select signal is four bits and the least significant bit is asserted, multiplexor 1202 will output instruction bus data lines 39–24 (IB[39:24]) to the first input of multiplexor 1210. Multiplexor 1204 will output instruction bus data lines 31–16 (IB[31:16]) to the second input of multiplexor 1210. Multiplexor 1206 will output data lines 31–8 (IB[31:8]) to the third input of mulitplexor 1210. Multiplexor 1208 will output data lines 23–0 (IB[23:0]) to the fourth input of multiplexor 1210. Final select signal will select one of the outputs of the first stage multiplexors as the output provided to MROM unit 34.

Figure 13:
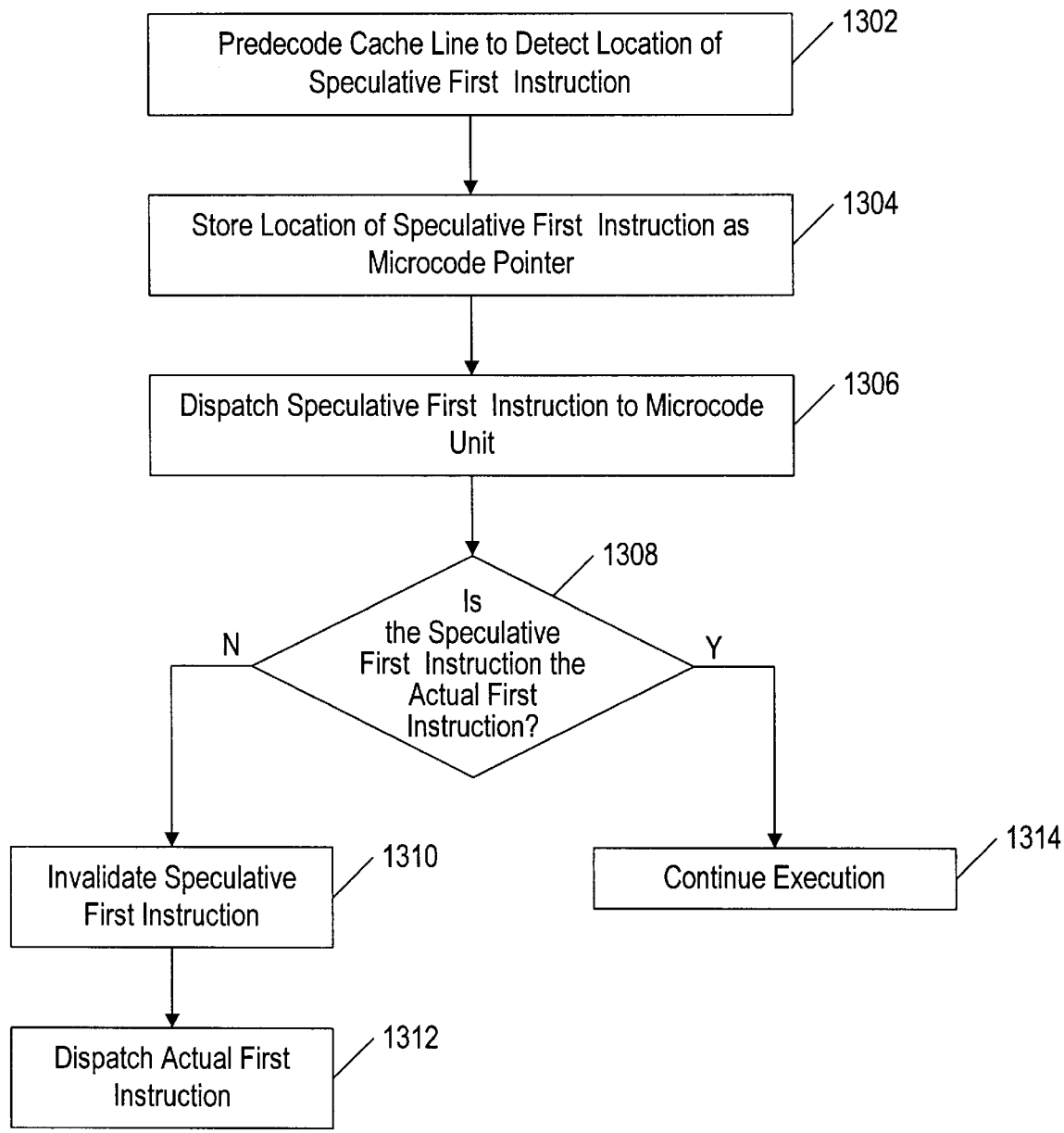
FIG. 13 is a flowchart illustrating the prediction of a first microcode instruction according to one embodiment of the present invention.

Tuning now to FIG. 13, a flowchart diagram illustrating the prediction of a first microcode instruction according to one embodiment of the present invention is shown. In step 1302, predecode data for a first cache line is generated. The predecode data includes the detection of the location of the first microcode instruction within the cache line. The first microcode instruction within the cache line is referred to as the speculative first microcode instruction. In one embodiment, other predecode data such as start bits, end bits and functional bits may be generated. In step 1304, the location of the speculative first microcode instruction detected in step 1302 is stored. The stored location is referred as a microcode pointer. In step 1306, when a cache line is encountered, the microcode instruction addressed by the microcode pointer is dispatched to the microcode unit. In other words, the speculative first microcode instruction is dispatched in microcode unit. In step 1308, it is verified whether the speculative first microcode instruction is the actual first microcode instruction. The actual first microcode instruction is the first microcode instruction from a cache line dispatched for execution. If all instructions within a cache line are dispatched for execution, the speculative first microcode instruction should be the actual first microcode instruction. If, however, instruction execution begins at an address within the cache line, for example, a branch to an instruction within the cache line, the speculative first instruction may not be the actual first microcode instruction. If the speculative first microcode instruction is not the actual microcode instruction then, in step 1310, the speculative first instruction is invalidated. In step 1312, the actual first microcode instruction is dispatched if the speculative first instruction is invalidated in step 1310. Alternatively, if the speculative first microcode instruction is the actual first microcode instruction, then execution continues at step 314.

Figure 14:
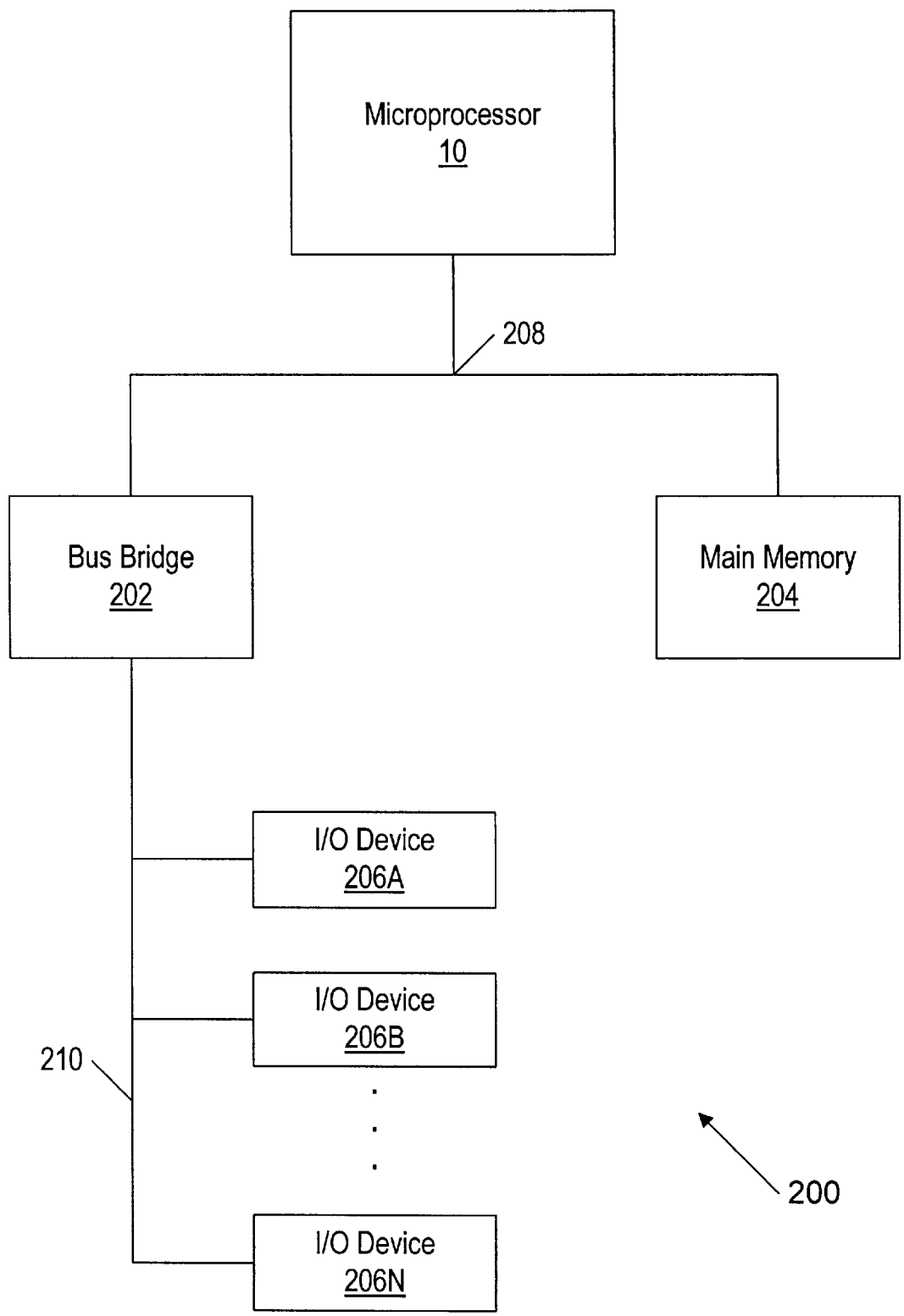
FIG. 14 is a block diagram of a computer system employing the microprocessor shown in FIG. 1.

Turning now to FIG. 14, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 410 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 410. Additionally, bus bridge 202 translates transactions from one bus protocol to another. In one embodiment, input/output bus 410 is an Enhanced Industry Standard Architecture (EISA) bus and bus bridge 202 translates from the system bus protocol to the EISA bus protocol. In another embodiment, input/output bus 410 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 14 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

What is claimed is:

1. A microprocessor comprising:
    a predecode unit configured to generate predecode data that identifies a location of a speculative instruction within a cache line;
    an instruction cache coupled to said predecode unit, wherein said instruction cache includes an instruction storage for storing instructions and a predecode storage for storing predecode data;
    a microcode unit configured to parse a microcode instruction into one or more fastpath instructions and dispatch said fastpath instructions into an instruction processing pipeline;
    an instruction scan unit coupled between said instruction cache and said microcode unit and configured to convey said speculative instruction identified by said predecode data to said microcode unit and configured to verify that said speculative instruction is a first microcode instruction within said cache line, wherein if said speculative instruction is not a first microcode instruction, said instruction scan unit conveys a signal to said microcode unit to invalidate said speculative instruction.

2. The microprocessor of claim 1 wherein said instruction scan unit conveys a non-speculative instruction in a subsequent clock cycle if said speculative instruction is invalidated.

3. The microprocessor of claim 1 wherein said predecode data further includes a start pointer, end pointer and functional bits that identify prefix and opcode bytes.

4. The microprocessor of claim 3 wherein a cache line stored in said instruction cache includes a plurality of bytes and a start bit, end bit and functional bit are associated with each of said bytes.

5. The microprocessor of claim 4 wherein said predecode data includes a microcode pointer associated with each cache line and said microcode pointer identifies said location of said speculative instruction.

6. The microprocessor claim 5 wherein each of said cache lines includes sixteen bytes and said microcode pointer includes four bits.

7. A method of predicting a first microcode instruction of a cache line comprising:
    predecoding a first cache line to detect a location of a speculative first instruction within said first cache line;
    storing said detected location of said speculative first instruction as a microcode pointer;
    dispatching an instruction addressed by said microcode pointer to a microcode unit when said first cache line is encountered;
    verifying that said instruction addressed by said microcode pointer is a first microcode instruction to be executed in said cache line; and
    invalidating said instruction if said instruction addressed by said microcode pointer is not said first microcode instruction to be executed in said cache line.

8. The method of claim 7 further comprising dispatching a non-speculative first instruction to said microcode unit if speculative first instruction is invalidated.

9. The method of claim 8 wherein said predecoding further identifies a start byte and end byte of each instruction within said cache line.

10. The method of claim 9 wherein said predecoding includes a start bit, an end bit and a functional bit for each byte of said cache line and said microcode pointer for each cache line.

11. The method of claim 10 wherein said cache line includes sixteen bytes and said microcode pointer includes four bits.

12. The method of claim 11 wherein said cache line and said data from said predecoding are stored in an instruction cache until said cache line is dispatched into an instruction processing pipeline.

13. A computer system comprising:
   a microprocessor including:
      a predecode unit configured to generate predecode data that identifies a location of a speculative instruction within a cache line;
      an instruction cache coupled to said predecode unit, wherein said instruction cache includes an instruction storage for storing instructions and a predecode storage for storing predecode data;
      a microcode unit configured to parse a microcode instruction into one or more fastpath instructions and dispatch said fastpath instructions into an instruction processing pipeline; and
      an instruction scan unit coupled between said instruction cache and said microcode unit and configured to convey said speculative instruction identified by said predecode data to said microcode unit and configured to verify that said speculative instruction is a first microcode instruction within said cache line, wherein if said speculative instruction is not a first microcode instruction, said instruction scan unit conveys a signal to said microcode unit to invalidate said speculative instruction;
   a main memory coupled to said microprocessor;
   a bus bridge coupled to said microprocessor; and
   an input/output device coupled to said bus bridge.

14. The computer system of claim 13 wherein said instruction scan unit conveys a non-speculative instruction in a subsequent clock cycle if said speculative instruction is invalidated.

15. The computer system of claim 13 wherein said predecode data further includes a start pointer, end pointer and functional bits that identify prefix and opcode bytes.

16. The computer system of claim 15 wherein a cache line stored in said instruction cache includes a plurality of bytes and a start bit, end bit and functional bit are associated with each of said bytes.

17. The computer system of claim 16 wherein said predecode data includes a microcode pointer associated with each cache line and said microcode pointer identifies said location of said speculative instruction.

18. The computer system claim 17 wherein each of said cache lines includes sixteen bytes and said microcode pointer includes four bits.

* * * * *